US009908574B2

(12) United States Patent
Salamon et al.

(10) Patent No.: US 9,908,574 B2
(45) Date of Patent: Mar. 6, 2018

(54) ADJUSTABLE ASSEMBLY OF A MOBILE BODYWORK PANEL WITH A FIXED BODYWORK PANEL

(71) Applicants: Ondrej Salamon, Bratislava (SK); Luzian Gawellek, Weilheim (DE); Andreas Langer, Ebersbach (DE)

(72) Inventors: Ondrej Salamon, Bratislava (SK); Luzian Gawellek, Weilheim (DE); Andreas Langer, Ebersbach (DE)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/034,897

(22) PCT Filed: Nov. 12, 2014

(86) PCT No.: PCT/EP2014/074408
§ 371 (c)(1),
(2) Date: May 6, 2016

(87) PCT Pub. No.: WO2015/071329
PCT Pub. Date: May 21, 2015

(65) Prior Publication Data
US 2016/0280295 A1 Sep. 29, 2016

(30) Foreign Application Priority Data
Nov. 14, 2013 (EP) .................................... 13192963

(51) Int. Cl.
*B62D 25/08* (2006.01)
*B62D 25/10* (2006.01)
(Continued)

(52) U.S. Cl.
CPC ............ *B62D 65/16* (2013.01); *B60P 3/2205* (2013.01); *B60R 19/24* (2013.01); *B62D 25/085* (2013.01);
(Continued)

(58) Field of Classification Search
CPC .. B62D 25/08; B62D 25/085; B62D 25/0163; B62D 2019/1886; B62D 2019/245;
(Continued)

(56) References Cited

U.S. PATENT DOCUMENTS 5,219,191 A 6/1993 Wolter
5,242,200 A * 9/1993 Kamm .................... B60R 19/24 293/126
(Continued)

FOREIGN PATENT DOCUMENTS

CN 101168370 A 4/2008
CN 102627090 A 8/2012
(Continued)

OTHER PUBLICATIONS

International Search Report PCT/ISA/210 for International Application No. PCT/EP2014/074408 Dated Jan. 19, 2015.
(Continued)

*Primary Examiner* — Gregory Blankenship
(74) *Attorney, Agent, or Firm* — Harness, Dickey & Pierce, P.L.C.

(57) ABSTRACT

An assembly of a vehicle fixed bodywork panel and a support part for this fixed bodywork panel, comprising one adjustment means in translation of the fixed bodywork panel comprising:

a translation member engaging said support part along a member translation axis;

a through hole arranged into a first portion of the bodywork panel, the member translation axis being offset from the through-hole, and;

(Continued)

32
34 14 16 12
36
34 14 38 32 4
26
18
28 30
26 4
16
12 a translation coupling element for the translation member and the fixed bodywork panel engaging the through hole, so that moving the translation member along the member translation axis causes a translation of the fixed bodywork panel relative to the support part in a translation direction allowing the fixed bodywork panel to be in a desired position, e.g. flush with a mobile bodywork panel.

19 Claims, 1 Drawing Sheet

(51) Int. Cl.
*B62D 33/023* (2006.01)
*B60R 19/24* (2006.01)
*B62D 65/16* (2006.01)
*B60R 19/18* (2006.01)
*B62D 25/16* (2006.01)
*B60P 3/22* (2006.01)

(52) U.S. Cl.
CPC ......... *B62D 25/105* (2013.01); *B62D 25/163* (2013.01); *B62D 33/023* (2013.01); *B60R 2019/1886* (2013.01); *B60R 2019/245* (2013.01)

(58) Field of Classification Search
CPC .... B62D 65/028; B62D 65/16; B62D 25/163; B62D 33/023; B60R 19/24; B60R 2019/1886; B60R 2019/245; B60P 3/2205
See application file for complete search history.

(56) References Cited

U.S. PATENT DOCUMENTS 7,793,998 B2 * 9/2010 Matsui .................... B60R 19/24 293/121
8,684,428 B2 * 4/2014 Sano ....................... B60R 19/24 293/154
2008/0100073 A1 5/2008 Mitsuyama
2010/0187841 A1 * 7/2010 Sano ....................... B60R 19/24 293/155
2012/0200121 A1 8/2012 Wuerfel
2014/0167454 A1 * 6/2014 Clapie .................. B62D 25/085 296/203.02
2015/0082599 A1 * 3/2015 Cunagin ................ B62D 49/04 29/428
2015/0291113 A1 * 10/2015 Farrington .............. B60R 19/24 29/897.2
2016/0280295 A1 * 9/2016 Salamon .............. B62D 25/163
2017/0036627 A1 * 2/2017 Mawston ............. B60Q 1/2638

FOREIGN PATENT DOCUMENTS

DE 10143607 A1 3/2003
DE 102006008216 A1 8/2007

OTHER PUBLICATIONS

Written Opinion of the International Searching Authority PCT/ISA/237 for International Application No. PCT/EP20141074408 Dated Jan. 19, 2015.
European Search Report for European Application No. EP 13192963.0 Dated Jan. 22, 2014.

* cited by examiner

ADJUSTABLE ASSEMBLY OF A MOBILE BODYWORK PANEL WITH A FIXED BODYWORK PANEL

CROSS-REFERENCE TO RELATED APPLICATIONS

This application is the U.S. National Phase application of PCT Application No. PCT/EP2014/074408 filed on Nov. 12, 2014, which claims priority to European Patent Application No. 13192963.0 filed on Nov. 14, 2013, the contents of each of which are incorporated herein by reference.

The present invention applies to the field of the assembly of a vehicle mobile bodywork panel with a fixed bodywork panel.

When assembling such bodywork panels of a vehicle, for example a hood and a front bumper, it is often required to adjust at least one panel's position, so that this panel is flush or in a desired position relative to the other adjacent panel.

The state of the art comprises already a number of adjustment means of the final position of a fixed bodywork panel, before fastening this fixed bodywork panel for example on a structural part of the vehicle. Such adjustment means typically use one or several screws that are applied on a surface portion of the bodywork panel, so as to cause a translation of the bodywork panel, through screwing or unscrewing. After a suitable adjustment of the fixed bodywork panel position, the fixed bodywork panel can be fastened on the structural part.

The state of the art techniques thus require typically the use of an adjustable part that has to be fixed in a suitable position, thus allowing controlling the position of the bodywork panel during adjustment through abutment against the adjustable part. Nevertheless this allows only rough adjustment (such as steps of 1 mm) with difficult control during adjustment of the adjustable part.

The invention aims to provide a technique for assembling a vehicle bodywork panel and a vehicle support part using translation adjustment means allowing a greater flexibility in the design of the fixed bodywork panel an accurate, continuous, and easy control of its final position in the translation direction.

To this end, the invention provides an assembly of at least a vehicle mobile bodywork panel, a vehicle fixed bodywork panel and a support part for this fixed bodywork panel, the assembly comprising fastening means of the fixed bodywork panel on the support part, characterized in that the assembly comprises at least one adjustment means in translation of the fixed bodywork panel, that is separate from said fastening means, and each of said adjustment means in translation comprises:

- a translation member that is engaging said support part along a member translation axis;
- a housing arranged into a first portion of the bodywork panel, the member translation axis being fully offset from this housing, the housing being preferably a through-hole, and;
- a translation coupling element of the translation member to the fixed bodywork panel, that is engaging inside said housing so that continuously moving the translation member along the member translation axis causes a continuous translation of the fixed bodywork panel relative to the support part in a fixed bodywork panel translation direction, thus allowing an adjustment of the relative position of the fixed bodywork panel and the support part, so that the fixed bodywork panel is in a desired position, for example a desired position relative to a mobile bodywork panel (8) in a closed position.

The expression "moving the translation member along the member translation axis" should be understood as a possible movement in the axis direction, but also in the opposite direction as well. Thus, the translation member allows a continuous adjustable translation of the fixed bodywork panel through the coupling element without the use of an adjustable additional part. The expression "fully offset" means that the member translation axis has no intersection with the housing walls e.g. the through-hole walls. This allows an easier design of the translation coupling element that can extend and engage the housing outside the member axis, while providing an easier access to the member axis so as to actuate this member in translation.

Most preferably, the translation member and the housing are configured to allow a continuous translation of the fixed bodywork panel in both ways of the fixed bodywork panel translation direction.

It should also be understood that the fixed bodywork panel can be deformable. Thus, the movement of the fixed bodywork panel along its full stroke can be somewhat different from a single translation movement in a single direction. Nevertheless, the full movement decomposes in several successive movements, each of them being sensibly identical to a translation movement along one specific fixed bodywork panel translation direction. Preferably, the translation member is a screw comprising a main screw axis that is the member translation axis. The use of a screw is a very simple technical means to get an adjustable means in translation.

In a preferred embodiment, the translation coupling element is a flange extending perpendicularly to the main screw axis and engaging inside the housing through a flange's sector, the flange being preferably centered on the main screw axis.

In one embodiment, the flange is coupled in rotation with the screw. For example, it can be integral with the screw (the flange and the screw forming a single part) and centered on the main screw axis. Such a flange is a very simple translation coupling element.

In an alternate embodiment, the flange can be a free in rotation flange. Nevertheless, in this alternate embodiment the free flange is a captive washer that remains linked with the screw and cannot be separated from the screw by screwing or unscrewing.

Advantageously, a sliding surface of a second portion of the fixed bodywork panel is matched in sliding translation with a support surface of a support portion of the support part, so that moving in translation the translation member when said sliding surface and said support surface are in contact one another, the fastening means being not tightened, causes a sliding translation in the fixed bodywork panel translation direction of the second portion of said fixed bodywork panel relative to the support portion of the support part. Thus, the fixed bodywork panel can slide over the support part during the adjustment phase.

For example, each of said sliding surface and said support surface can be flat. In another embodiment, each of said sliding surface and said support surface can be cylindrical.

The fastening means can apply along a fastening axis forming an angle that is often near 90°, for example an angle of at least 60° with the fixed bodywork panel translation direction, the fastening axis being preferably perpendicular to the fixed bodywork panel translation direction. An angle near 90° allows fastening the fixed bodywork panel without modification of the fixed bodywork panel's adjustment in translation.

Advantageously, the fixed bodywork panel comprises a wall comprising an access hole for moving the translation member through this access hole, for example an access hole for a screw-driver. This allows using a standard screw-driver to move the translation member. An advantage of such an arrangement is that the translation member and its actionable head, for example a screw head, can be hidden, that increases the vehicle quality feeling by the vehicle owner. The access hole is thus typically dimensioned with the minimum size allowing to action the translation member.

The fixed bodywork panel may comprise at least two separate housings (for example at least one for each side of the vehicle or often at least two separate housings for each side of the vehicle, when the fixed bodywork panel extends along the two sides of the vehicle), each formed by one elongated rectangular section through hole for one adjustment means in translation, said housings being typically arranged on the same side of the vehicle with a distance D between centers of said elongated through holes that is between 15 mm and 250 mm, preferably between 80 and 150 mm.

This allows adjusting the position of the fixed bodywork panel in several points, typically along the joining line towards the mobile bodywork panel. Thus, for an example, a bumper can be made flush with a hood in several points of this bumper, so as to get a desired position. In some cases, the desired position of the bumper is not flush with the hood, but offset of several tenths of a millimeter, or eventually one or several millimeters from the hood.

The distance between the fastening axis and the center of at least one of said elongated through holes can be short, for example between 20 mm and 120 mm, and preferably between 30 mm and 90 mm.

The housing into the fixed bodywork panel of the adjustment means in translation is advantageously an elongated housing extending in a main direction, preferably an elongated through-hole, with:

- a housing ratio: maximum length in the main direction/maximum width in the direction perpendicular to the main direction being between 5 mm and 40 mm, and preferably between 15 mm and 25 mm.
- a full clearance of the translation coupling element relative to the housing (16) of between 0 mm and 0.8 mm, and preferably between 0 mm and 0.2 mm.

Preferably, the housing is an elongated through-hole, said maximum width is comprised between 0.8 mm and 2.5 mm, and the full clearance of the translation coupling element relative to the housing is comprised between 0 mm and 0.8 mm, and preferably between 0 mm and 0.2 mm.

This full clearance can be defined as the travel distance between the two end positions of the translation coupling element inside the housing when moving this translation coupling element along its coupling element translation direction without inducing a movement of the fixed bodywork panel.

Typically, the fixed bodywork panel translation direction forms an angle of at most 30°, and preferably at most 10° with a horizontal plane. The fixed bodywork panel translation direction can also be in a horizontal plane.

Preferably, the fixed bodywork panel translation direction forms an angle of at most 30°, and preferably at most 20° with the translation axis. The fixed bodywork panel translation direction can also form an angle of 0° with the translation axis.

The fixed bodywork panel can be one of a front bumper, a rear bumper a front fender, a rear fender.

The support part can be one of a front end module, a beam, a cross member, a light module, a plenum module, a washer tank module, and a battery module.

The assembly may also comprise a mobile bodywork panel that is a hood or a tail gate or a side door. In this case, the desired position of the fixed bodywork panel is advantageously a suitable position relative to the mobile bodywork panel in a closed position.

The desired position of the fixed bodywork panel is often a flush position with the mobile bodywork panel in a closed position of the mobile bodywork panel, but can also be different, for example a position that is offset of tenths of a millimeter or eventually one or several millimeters (e. g. between 0.1 mm and 5 mm, or between 0.3 mm and 1.5 mm) from the flush position, in one offset direction or in the opposite offset direction.

Typically, the fixed bodywork panel is a front or a rear bumper and the mobile bodywork panel is a hood or a tailgate arranged at the same end of the vehicle as the fixed bodywork panel.

The invention is also relative to a process for assembling a vehicle fixed bodywork panel to be fixed on a support part in a desired position, e.g. a flush position relative to a vehicle mobile bodywork panel in a closed position, characterized in that the vehicle fixed bodywork panel and the support part are the vehicle fixed bodywork panel and the support part of an assembly as already mentioned, and in which:

- before applying tightly the fastening means, the relative position between the fixed bodywork panel and the support part is adjusted through moving in translation the translation member, so that the fixed bodywork panel is in the desired position, e.g. flush with the mobile bodywork panel;
- and then the fastening means are applied so as to tighten the fixed bodywork panel together with the support part.

The invention will be explained more completely through the description of the followings figures in which.

Figure 1:
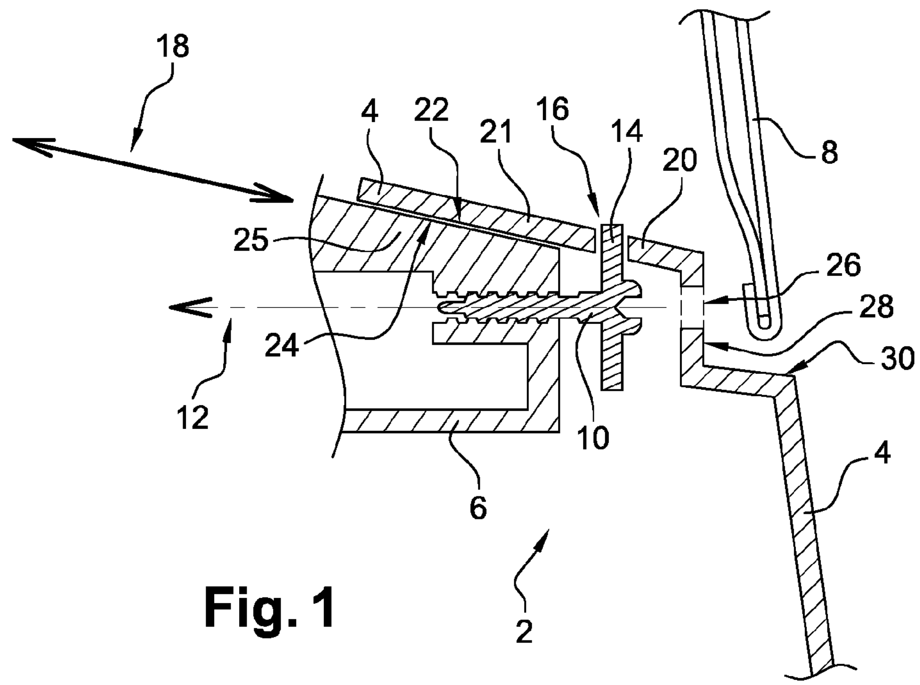
FIG. 1 shows a cross-view of an assembly according to the invention.

We refer now to FIG. 1 showing an assembly 2 of a vehicle fixed bodywork panel 4, a support part 6 for this fixed bodywork panel 4, and a vehicle mobile bodywork panel 8 that is flush with the fixed bodywork panel 4.

In FIG. 1, the fixed bodywork panel 4 is a front bumper, and the mobile bodywork panel 8 is a hood.

The assembly 2 also comprises a translation member 10 formed by a screw engaging the support part 6 along a member translation axis 12.

The assembly further comprises a translation coupling element for the translation member and the fixed bodywork panel 4, this translation coupling element consisting in a screw flange 14 engaging inside a housing 16 of the fixed bodywork panel 4.

Therefore, moving the translation member 10 along the member translation axis 12 causes a translation of the fixed bodywork panel 4 relative to the support part 6 in the fixed bodywork panel translation direction 18. This allows adjusting the position of the fixed bodywork panel 4 relative to the support part 6, so that the fixed bodywork panel 4 is flush with the mobile bodywork panel 8 in at least one position of this mobile bodywork panel 8 (when this panel (hood) is closed).

Preferably, the clearance between the flange 14 and the housing 16 is minimum, so as to allow a free engagement and rotation of the flange inside the housing and an immediate translation effect on the fixed bodywork panel 4 both in one axis and the reverse axis corresponding to the fixed bodywork panel translation direction 18. Thus an accurate adjustment of the position of the fixed bodywork panel 4 can be achieved easily, through screwing or unscrewing the screw (i.e. the translation member 10).

After achieving such adjustment in translation, the fixed bodywork panel 4 can then be strongly fixed in a suitable position on the support part 6, by means not shown on FIG. 1.

As shown on FIG. 1, the housing 16, which is a through hole, is arranged in a first portion 20 of the fixed bodywork panel that is forming a flat surface together with a sliding surface 22 of a second portion 21 of said fixed bodywork panel 4 that is supported by a support surface 24 of a corresponding support portion 25 of the support part 6. In FIG. 1, the second portion 21 of the fixed bodywork panel is the flat portion corresponding to the sliding surface 22.

This allows achieving a sliding translation in the fixed bodywork panel translation direction 18 of the second portion 21 of said fixed bodywork panel 4 relative to the support portion 25 of the support part 6 when moving in translation the translation member 10, the fastening means between the fixed bodywork panel 4 and the support part 6 not being tightened. Thus the support part 6 can be a support for the fixed bodywork panel 4, not only at a final stage, after fastening these two elements together, but also during the adjustment stage.

An easy access to the screw head is also provided through an access hole 26 for a screw driver, arranged into a portion 28 of the fixed bodywork panel 4. This access hole 26 is typically masked by the mobile bodywork panel 8 (the hood) when this panel is in the final position, as shown on FIG. 1. Then, the hood must be raised during the adjustment of the fixed bodywork panel's position. This adjustment can be made by trials and errors, until the suitable position flush with the hood is achieved. Nevertheless, more preferably, the hood can be raised only by a very small height, using a wedge arranged on a ledge 30 of the fixed bodywork panel 4. Thus, the adjustment can be made quite easily, without numerous trials and errors.

Figure 2:
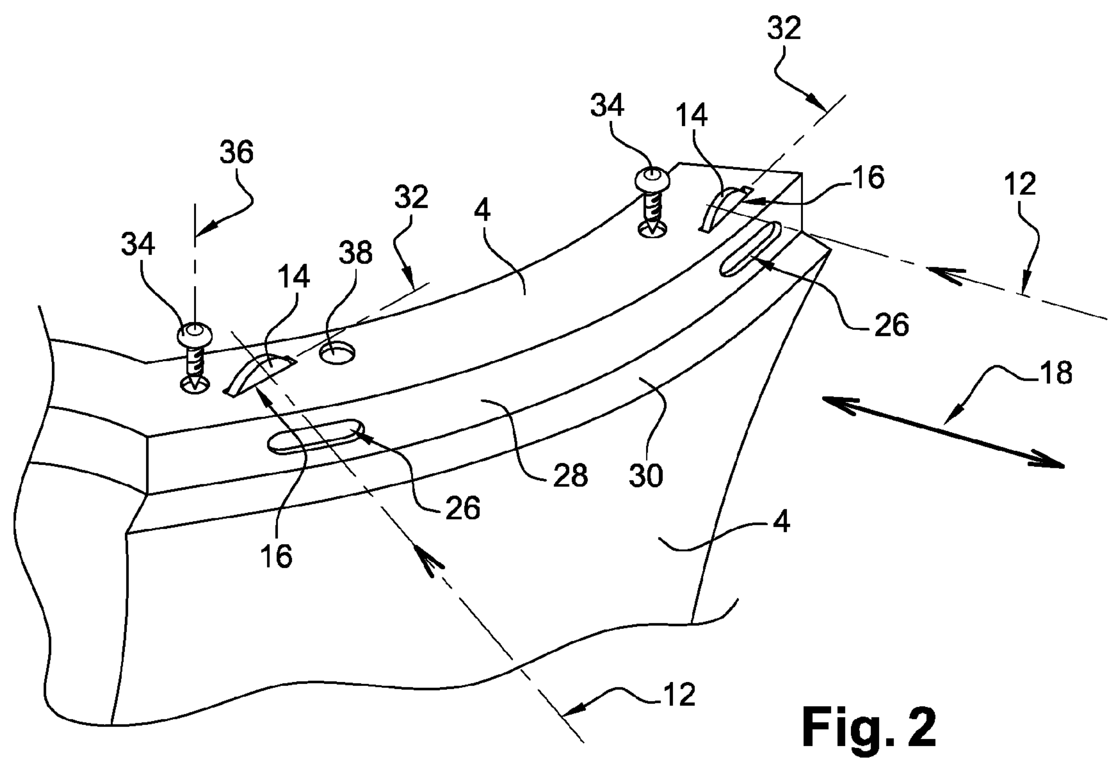
FIG. 2 shows a perspective view of a portion of an assembly according to the invention.

We now refer to FIG. 2, showing in a perspective view a portion of the assembly of FIG. 1 (mainly a portion of the fixed bodywork panel 4, the support part 6 and the hood being not shown).

It can be shown on FIG. 2 that the fixed bodywork panel 4 (a front bumper) comprises two different housings 16, formed by elongated through holes, or slots, arranged on the same side of the vehicle. The whole front bumper can have typically between 4 and 8 of such slots, so as to make local adjustments of the bumper flush with the hood.

Such local adjustments in translation can be done, to some extent, using a fixed bodywork panel translation direction 18 which is different for one another, because the bumper is an elongated panel that is partially deformable. Thus, each elongated through hole shown in FIG. 2 is a rectangular section slot extending along a direction 32 that can differ from one another. In a similar manner, the two translation axis 12 can be not parallel one another.

Fastening means 34, formed by screws engaging the support part 6 along a fastening axis 36 allow the final fixation of the bumper on the support part 6, after achieving the adjustments in translation of the bumper flush with the hood, at two positions on the same side of the vehicle. Preferably, the fastening axis is substantially vertical.

FIG. 2 shows additionally a housing 38 into the bumper for pre-positioning the bumper before the adjustments in translation, this housing being engaged by an initial centering pin arranged on the support part, not shown on FIG. 2. Such pin can be optionally breakable, so as to allow a greater translation adjustment range.

The invention is not limited to the embodiment shown on FIGS. 1 and 2, and a man skilled in the art will be able to implement the invention under other embodiments using any technical feature compatible with the invention, that is already known in the state of the art.

The invention claimed is:

1. An assembly of at least a vehicle fixed bodywork panel and a support part for this fixed bodywork panel, the assembly comprising fastening means of the fixed bodywork panel on the support part, wherein:

the assembly comprises at least one adjustment means in translation of the fixed bodywork panel, that is separate from said fastening means, each of said adjustment means in translation comprises:

- a translation member that is engaging said support part along a member translation axis;
- a housing arranged into a first portion of the bodywork panel, the member translation axis being fully offset from the housing, and;
- a translation coupling element of the translation member to the fixed bodywork panel, that is engaging inside said housing so that moving continuously the translation member along the member translation axis causes a continuous translation of the fixed bodywork panel relative to the support part in a fixed bodywork panel translation direction, thus allowing an adjustment of the relative position of the fixed bodywork panel and the support part, so that the fixed bodywork panel is in a desired position, the assembly being characterized in that the fixed bodywork panel comprises a wall comprising an access hole for moving the translation member through this access hole.

2. The assembly according to claim 1, wherein the translation member and the housing are configured to allow a continuous translation of the fixed bodywork panel in both ways of the fixed bodywork panel translation direction.

3. The assembly according to claim 1, wherein the translation member is a screw comprising a main screw axis that is the member translation axis.

4. The assembly according to claim 3, wherein the translation coupling element is a flange extending perpendicularly to the main screw axis and engaging inside the housing through a flange's sector.

5. The assembly according to claim 1, wherein a sliding surface of a second portion of the fixed bodywork panel is matched in sliding translation with a support surface of a support portion of the support part, so that moving in translation the translation member when said sliding surface and said support surface are in contact one another, the fastening means being not tightened, causes a sliding translation in the fixed bodywork panel translation direction of the second portion of said fixed bodywork panel relative to the support portion of the support part.

6. The assembly according to claim 1, wherein the housing into the fixed bodywork panel of the said at least one adjustment means in translation is formed by an elongated housing extending in a main direction, with:

a housing ratio: maximum length in the main direction/maximum width in the direction perpendicular to the main direction being between 5 and 40;

a full clearance of the translation coupling element relative to the housing between 0 and 0.8 mm.

7. The assembly according to claim 6, wherein the housing is an elongated through-hole, said maximum width is comprised between 0.8 mm and 2.5 mm, and the clearance of the translation coupling element relative to the housing is comprised between 0 mm and 0.8 mm.

8. The assembly according to claim 1, wherein the fixed bodywork panel translation direction forms an angle of at most 30° with a horizontal plane.

9. The assembly according to claim 1, wherein the fixed bodywork panel is one of a front bumper, a rear bumper, a front fender, and a rear fender.

10. The assembly according to claim 1, wherein the support part is one of a front end module, a beam, a cross member, a light module, a plenum module, a washer tank module, and a battery module.

11. The assembly according to claim 1, comprising a mobile bodywork panel, that is a hood or a tail gate, and the desired position of the fixed bodywork panel is a suitable position relative to the mobile bodywork panel in a closed position.

12. The assembly according to claim 1, wherein the fixed bodywork panel is a front or a rear bumper and a mobile bodywork panel is a hood or a tailgate arranged at the same end of the vehicle as the fixed bodywork panel.

13. The assembly according to claim 1, wherein the desired position of the fixed bodywork panel is a flush position with a mobile bodywork panel in a closed position of the mobile bodywork panel.

14. The assembly according to claim 1, wherein the housing is a through hole.

15. The assembly according to claim 1, wherein the access hole is an access hole for a screwdriver.

16. The assembly of claim 4, wherein the flange is centered on the main screw axis.

17. The assembly according to claim 8, wherein the fixed bodywork panel translation direction forms an angle of at most 10° with the horizontal plane.

18. A process for assembling a vehicle fixed bodywork panel to be fixed on a support part in a desired position relative to a vehicle mobile bodywork panel in a closed position, characterized in that the vehicle fixed bodywork panel and the support part are the vehicle fixed bodywork panel and the support part of an assembly according to claim 1, and in which:

before applying tightly the fastening means, the relative position between the fixed bodywork panel and the support part is adjusted through moving in translation the translation member, so that the fixed bodywork panel is in the desired position;

and then the fastening means are applied so as to tighten the fixed bodywork panel together with the support part.

19. The process of claim 18, wherein the desired position includes a position that is flush with the mobile bodywork panel.

* * * * *